Oct. 24, 1933.  J. J. JAKOSKY ET AL  1,931,800
APPARATUS FOR EFFECTING DISSOCIATION OR OTHER REACTION OF ORGANIC LIQUIDS
Filed June 13, 1931  3 Sheets-Sheet 1
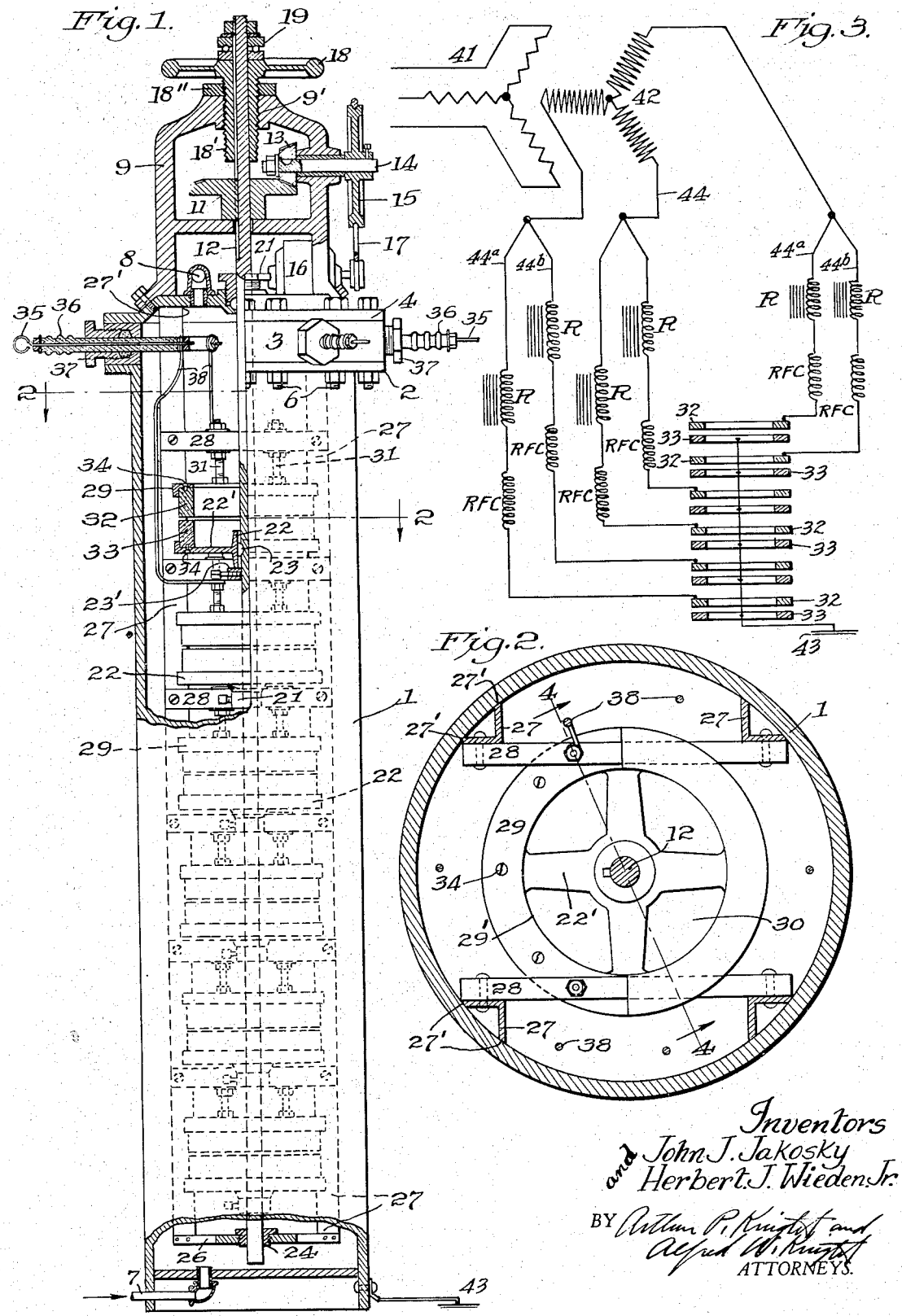
Inventors
John J. Jakosky
and Herbert J. Wieden Jr.

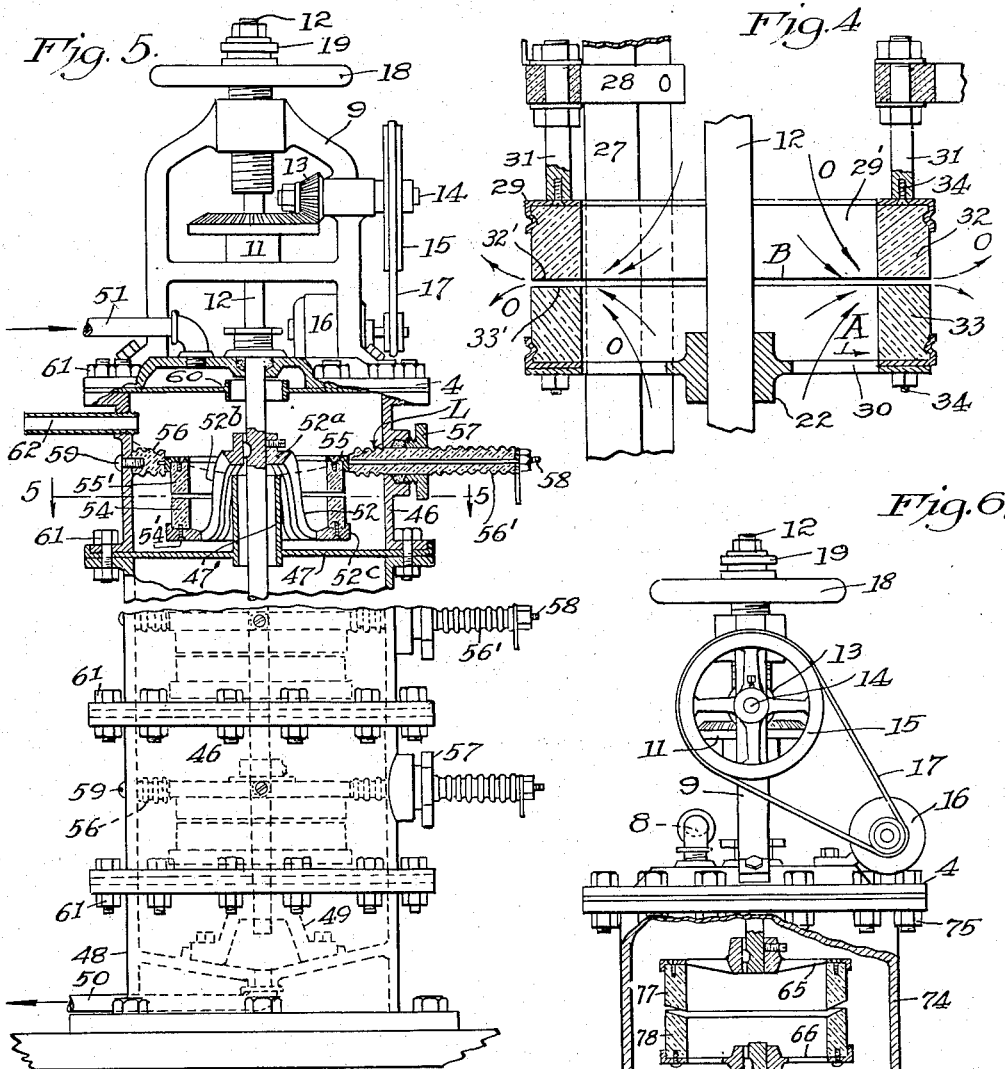
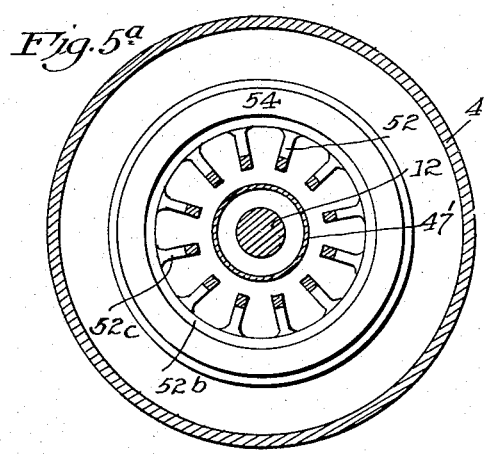

Oct. 24, 1933.  J. J. JAKOSKY ET AL  1,931,800
APPARATUS FOR EFFECTING DISSOCIATION OR OTHER REACTION OF ORGANIC LIQUIDS
Filed June 13, 1931  3 Sheets-Sheet 3
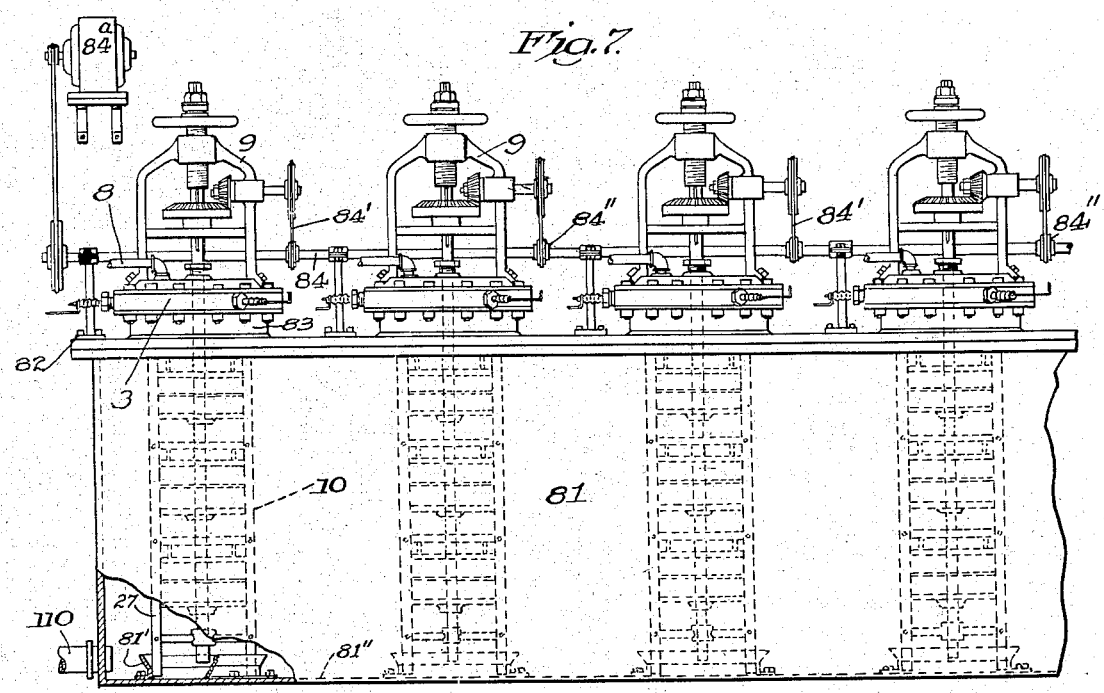
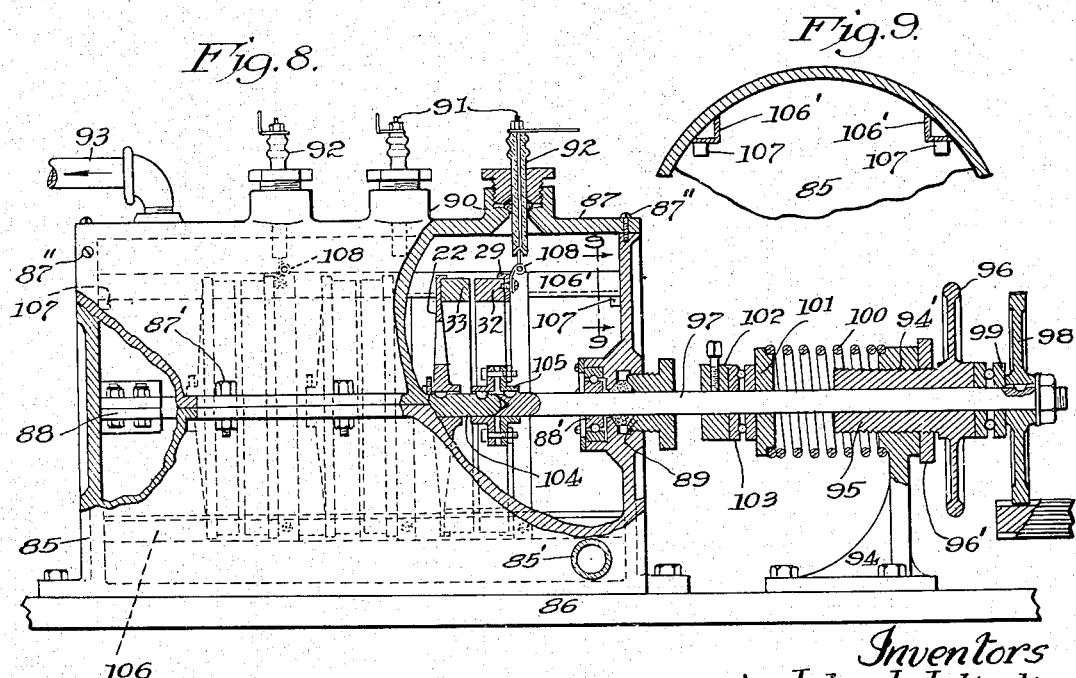
Inventors
John J. Jakosky
and Herbert J. Wieden, Jr.
BY
ATTORNEYS.

Patented Oct. 24, 1933

1,931,800

UNITED STATES PATENT OFFICE 1,931,800

APPARATUS FOR EFFECTING DISSOCIATION OR OTHER REACTION OF ORGANIC LIQUIDS

John J. Jakosky, Los Angeles, and Herbert J. Wieden, Jr., Palms, Calif., assignors to Electroblacks, Inc., Culver City, Calif., a corporation of Nevada Application June 13, 1931. Serial No. 544,106

12 Claims. (Cl. 13—7)

This invention relates to apparatus for the treatment of organic liquids, such as liquid hydrocarbons or other carbon bearing oils, and particularly to apparatus for this purpose in which one or more electric arcs are maintained beneath the surface of the liquid for effecting thermal treatment thereof. The principal object of this invention is to provide an apparatus in which an organic liquid may be subjected to an electric arc treatment in a highly efficient manner and with a minimum consumption of electric energy for a given treatment.

A particularly advantageous use of the apparatus is in the production of carbon black, which is carbon in highly comminuted form, from petroleum or other carbon bearing oils, wherein a body of such oil is subjected to thermal dissociation in a reaction chamber provided with one or more pairs of arcing electrodes, the oil being caused to flow between the electrodes of said pairs and being thus subjected to the arcs therebetween. The carbon black thus produced from the dissociation of such oil remains suspended therein and may be removed therefrom by centrifugal, filtration or extraction manipulations after withdrawal thereof from the apparatus.

Forms of apparatus of the above general type have already been described in United States patents to Jakowsky No. 1,597,277 and to Jakosky No. 1,673,245. In the use of such forms of apparatus, however, difficulty has been found in maintaining a positive and continuous circulation of liquid into and through the arcing zone between the electrodes, particularly when the electrodes are moved relative to one another at the high velocities which are desirable in order to obtain high efficiency of utilization of electric energy and to avoid difficulties due to irregular deposition of carbon or other solid products of reaction on the electrodes and excessive formation of gas pockets therebetween. An important object of the present invention, therefore, is to provide electrode means which are so designed and so disposed that the relative movement thereof in the normal operation of the apparatus maintains a positive and continuous circulation of the surrounding liquid into and through the arcing zone between the electrodes.

Furthermore, in using electrodes of certain types and designs, difficulties have been encountered due to the tendency of the electric arc to remain in a given position with respect to at least one of the electrodes, resulting either in unequal wearing away of the electrodes or in irregular deposition of carbon or other solid reaction products thereon, and in the types of apparatus heretofore employed it has generally been found necessary, in order to overcome these difficulties, to continually move both electrodes so as to bring fresh portions of the surfaces of both electrodes into position for arcing therebetween.

An important object of the present invention is to provide one or more pairs of oppositely charged and relatively rotatable electrodes having opposing faces of extended area disposed equidistant from one another throughout such area during relative rotation of said electrodes, thus continually providing a multiplicity of possible arcing paths between said opposing surfaces and preventing continued localization of arc formation at any certain portion of such surfaces. A further object is to provide an electrode arrangement as above described in which the relative rotation of the electrodes tends to cause continuous displacement of an arc once formed between any portion of said opposing surfaces, such displacement occurring with respect to the surfaces of both electrodes, so that such arc may be continually maintained and is caused to be continually moved to fresh portions of the arcing surfaces of both electrodes. A particular advantage gained by this construction is that one of the electrodes, or one electrode of each pair where a plurality of pairs are used, may remain fixed or stationary, and it is only necessary to actually rotate one electrode, or one electrode of each pair, the continuous displacement of the arc due to movement of said one electrode serving to cause the arc to continually move to new portions of the extended arcing surfaces of both the fixed and moving electrodes.

A further object of the invention is to provide an electrode arrangement consisting of a series of relatively fixed electrodes having arcing faces and a series of relatively rotatable oppositely charged electrodes having arcing faces opposing the arcing faces on the respective fixed electrodes, said rotatable electrodes being mounted on a common shaft provided with driving means, and externally operable adjustment means whereby the electrodes of one series may be simultaneously moved in a direction parallel to the axis of rotation of such electrodes toward or away from the corresponding electrodes of the other series, whereby the arc gaps between the rotatable and fixed members of the electrode system may be controllably varied to compensate for the wear of said electrodes or for a change in operating conditions during the operation of the apparatus.

A further object of one embodiment of the invention is to provide a series of vertically superposed electrode units, each comprising a pair of opposing electrodes, and means for maintaining each electrode unit immersed in a separate body of liquid substantially to the same depth, so as to provide for the operation of a plurality of units under substantially the same pressure conditions, the liquid being successively passed through said units, preferably from the upper to the lower units.

The above objects may be advantageously accomplished, according to our invention, by means of an apparatus comprising a reaction or dissociation chamber provided with means for maintaining a body of organic liquid therein, and one or more pairs of electrodes immersed in such body of liquid within such chamber and defining one or more arc gaps beneath the surface of said liquid, each of said electrode pairs comprising two electrodes relatively rotatable about a common axis and having extended arcing faces or surface areas opposingly disposed and formed as similar substantially complete surfaces of revolution about said common axis so that all points on the arcing face of either electrode in any pair are at all times in position to permit arcing to the opposing face of the other electrode of such a pair. Means are provided for causing rapid and continuous relative rotation of the electrodes of each pair, while maintaining uniform spacing between said electrodes, and the configuration of the arcing faces is such that all parts of said faces of both electrodes remain equally spaced during such rotation. The electrodes are preferably ring-shaped, at least one of said electrodes being so disposed as to permit access of the surrounding liquid to points adjacent the interior portions of the gap separating the arcing surfaces of said electrodes. One of the electrodes of each electrode pair is also preferably movable in a direction parallel to the axis of relative rotation of said electrodes, whereby the gap separating the electrodes in each pair may be controllably varied, and when a plurality of pairs of electrodes are provided having a common axis, means are also preferably provided for simultaneously effecting such arc gap adjustment for all the pairs. The electrodes are additionally provided with electrical conducting means whereby they may be energized so as to provide for electrical arcing between the electrodes in said pairs.

One embodiment of the invention comprises a series of vertically disposed units in separate chambers in which each electrode pair is provided with a separate body of submerging liquid, such liquid being circulated progressively from the upper to the lower unit. This latter embodiment provides for the utilization of a column of units in which each of the electrode pairs is immersed in liquid to substantially the same depth, whereby the pressure under which said electrodes operate is substantially the same in each unit.

The accompanying drawings illustrate apparatus embodying this invention, and referring thereto:

Fig. 1 is a partly sectional elevation of a reaction chamber provided with a plurality of electrode members beneath the surface of the body of liquid therein.

Fig. 2 is a transverse section on line 2—2 in Fig. 1.

Fig. 3 is a schematic wiring diagram for a six unit reaction chamber, showing power supply to the several electrode means.

Fig. 4 is a vertical section on line 4—4 in Fig. 2, showing paths of liquid flow toward and through the arc gaps.

Fig. 5 is a partly sectional elevation of an alternative form of apparatus according to my invention.

Fig. 5a is a transverse section thereof on line 5a—5a of Fig. 5.

Fig. 6 is a partly sectional elevation of an alternative form of apparatus provided with two rotatable electrodes according to my invention.

Fig. 7 is a side elevation of a form of apparatus provided with a plurality of units of the form shown in Fig. 1.

Fig. 8 is a longitudinal vertical partly sectional view of an alternative form of apparatus according to my invention.

Fig. 9 is a view of a portion thereof along line 9—9 in Fig. 8.

The apparatus shown in Figs. 1, 2, and 4 comprises a reaction chamber or vessel 1 provided with a flanged portion 2 supporting an electrode lead-in ring 3 and a cover 4 secured thereto in any suitable manner as, for example, by means of bolts 6 so as to make a fluid tight fit between the cover, electrode lead-in ring and vessel. A pipe 7 leads into the lower portion of chamber 1 for supplying organic liquid thereto and a pipe 8 leads from the upper portion of the vessel, for example from cover 4, for conducting away gaseous products of dissociation or reaction, either with or without partially reacted liquid and suspended products of reaction.

The cover 4 is provided with an operating head means 9 disposed thereon consisting of a bevel gear 11 slidably keyed to shaft 12 and meshing with gear 13 secured to shaft 14 carrying pulley 15 operable by motor 16 through belt 17, whereby shaft 12 may be rapidly rotated upon the operation of motor 16. Shaft 12 is provided with height adjusting means consisting for example of a hand wheel 18 having a threaded portion 18′ coacting with threaded portion 9′ of operating head 9, shaft 12 being supported by hand wheel 18 by means of thrust bearing 19 and adjustably raisable or lowerable upon rotation of said hand wheel in the proper direction. Lock nut 18″ serves to hold said adjustment means in any desired position.

Shaft 12 extends through stuffing box 21 in cover 4 into vessel 1, carrying a plurality of electrode holding members 22 secured thereto at intervals in any suitable manner as, for example, by means of keys 23 and set collars 23′, said shaft being supported at the lower end by bearing 24 connected by arms 26 to vertical frame members 27. Each electrode holder 22 comprises, as shown, an annular ring-shaped portion connected to the hub portion thereof by radial arms 22′ providing openings 30 therebetween, which permit access of the oil to the interior of the electrodes.

The fixed electrode assembly comprises the vertical frame members 27, formed of angle iron, fitting closely within the sides of vessel 1 as at points 27′, with the salient angle disposed toward the center of the vessel 1 and having disposed thereon at suitable intervals lateral members 28 formed of bakelite or similar insulating material. A plurality of ring-shaped fixed electrode-carrying members 29 provided with central openings 29', are disposed on the respective lateral members 28 in any suitable manner as by means of extension bolts 31. The ring shaped upper and lower electrodes 32 and 33 are secured to fixed and rotatable electrode-carrying members 29 and 22 respectively, in any suitable manner as, for example, by means of screws 34. The respective fixed electrodes 32 are shown as mounted above the corresponding rotatable electrodes 33, so that raising of shaft 12 decreases the gap between the opposing arcing faces thereof.

The opposing faces 32' and 33' of the respective electrodes of each pair are formed as similar surfaces of revolution about the axis of shaft 12. For example, such surfaces may consist of parallel rings disposed in horizontal planes, as shown.

Electrode leads 35, provided with insulators 36, lead through ring 3 provided with stuffing boxes 37, and conductors 38 secured to the inside ends of leads 35 provide electrical contact to each fixed electrode 32, a separate lead-in being provided for each fixed electrode. The outer ends of leads 35 may be connected to any suitable source of electric current. The rotating electrodes 33 are shown as all electrically connected with shaft 12 through the metallic carrying members 22, and said electrodes, together with the shaft, may be grounded either directly or through the casing as at 43. It will be understood that any suitable insulating and protecting means may be provided for the exposed portions of leads 35 and the high tension supply conductors connected thereto, so as to permit access to the apparatus, without danger of injury, during operation.

Fig. 3 shows schematically a wiring diagram which may be used in connecting the electrodes to a proper source of current and referring thereto, 41 is the primary of a transformer, connected to any available supply of three-phase alternating current, 42 is the secondary of said transformer, the leads 44 from which are branched so that each lead-off provides connection through branch conductors 44a and 44b to two separate fixed electrodes 32 through a reactor "R" and a radio-frequency choke "RFC". The rotatable electrodes 33 are indicated as electrically connected together and to the ground at 43 as above described.

In the operation of the above described apparatus, the organic liquid to be treated is supplied at the bottom inlet 7 and the rotatable electrode assembly is rapidly and continuously rotated by motor 16 whereupon a circulation of the liquid is established between the electrodes in each electrode pair. This circulation is shown schematically in Fig. 4 by the arrows "O", and is produced centrifugally by the rotation of the lower electrodes of each pair and obtains a positive circulation of liquid between the arcing faces of the two electrodes of each electrode pair where it is subjected to the influence of the electric arc therebetween. This circulation is caused by the rotating electrode, frictionally imparting rotary movement to the body of liquid in the interior thereof and in the arc gap, thus causing this liquid to be positively moved by centrifugal force outwardly into and through said arc gap. The openings 29' and 30 in the fixed and rotating electrodes serve to permit continual inflow of additional liquid to the interior of the electrodes and thus maintain circulation. In this manner dead spaces or gas pockets between the electrodes are prevented and a constant supply of liquid is provided to the arc at all times. In addition, the rotation of one electrode of each pair relative to the other in the described manner serves, by continually offering every point on its surface to every point on the fixed electrode which is radially equidistant thereto from the axis of rotation, to equalize the wear of the electrodes so that they preserve substantially parallel faces whereby the efficiency of the arcing electrodes is maintained at a maximum.

Assuming that the rotating electrode is rotating in the direction indicated by the arrow "A" in Fig. 4, at the side of the electrode shown in said figure, any arc formed between the opposing arcing faces, as at "B", is caused to move in the same direction as the rotating electrode, due to the rotative motion of the liquid, at a speed somewhat less than that of the electrode, thus continually contacting fresh portions of the arcing faces of both the rotating and fixed electrodes.

The liquid is caused, by the arcs thus formed, to dissociate and form carbon or other solid reaction products and also gaseous or liquid reaction products, the solid reaction products being quickly disseminated into the relatively low temperature liquid surrounding the arc, all as described in our above mentioned patents. Portions of the liquid are re-circulated between each pair of electrodes, but the continual inflow of fresh liquid at the bottom of the chamber causes the liquid to progress upwardly and thus pass successively through the arc gaps between the several pairs of electrodes. The gaseous products rise through the liquid and escape from the chamber through pipe 8, and after the chamber becomes filled with liquid there is a continual outflow through said pipe of such gaseous products together with unreacted liquid containing any liquid and solid reaction products.

In the use of the apparatus in the production of carbon black from a carbon bearing oil according to the above procedure, the solid product of reaction, i. e., carbon black, remains in suspension in finely divided condition in the partially reacted oil and is removed from the apparatus together with said partially reacted oil and any gaseous reaction products, which gaseous reaction products may be removed from the suspension in any suitable manner, and the suspension may then be either used as such in the preparation of ink, or may be subjected to any suitable further treatment to recover the carbon black therefrom in a dry, oil free state or in any other condition.

The arc gap separating the electrodes may be regulated by an adjustment of the height of the rotatable electrode assembly by means of hand wheel 18. This permits the maintenance of a desired arcing distance between the electrodes as said electrodes wear away in use, without necessitating stopping or dismantling of the apparatus for that purpose. The apparatus may be dismantled for inspection or repair by removing the nuts from bolts 6 and raising the cover, thus lifting the entire electrode assembly, including both the fixed and rotatable electrodes, out of the vessel 1. The apparatus may then be overhauled or inspected with facility as all working parts are in full access.

Figs. 5 and 5a illustrate an alternative form of apparatus according to our invention comprising a series of superposed reaction chambers defined by rings 46 and partitions 47, together with a bottom portion 48 provided with bearing means 49 and a liquid discharge pipe 50, and a cover 4 and operating head means 9 which may be substantially the same as shown in Fig. 1, said cover being provided with a liquid inlet pipe 51. The rotatable shaft 12 extends through cover 4 into and through each reaction chamber and is supported at the lower end by bearing 49, said shaft carrying the lower electrode carrying members 52 of each electrode pair secured thereto, each such lower electrode carrying member having disposed thereon ring-shaped electrode 54 of the type illustrated in Figs. 1, 2 and 4 secured thereto as by means of screws 54'. The upper, fixed electrode carrying members 55 provided with ring-shaped electrodes 55' are disposed on rings 46 by means of a plurality of insulating support members 56, one of which, 56', extends through the side of ring 46 and through packing gland 57 and is provided with a central lead-in connector 58 the inside extremity of which is in electrical contact with the fixed electrode carrying member 55, the remaining insulating support members 56 being secured to the side wall of ring 46 by any suitable means such as, for example, by screws 59.

Each partition 47 is provided with a centrally disposed liquid-level regulating sleeve 47' for the dual purpose of maintaining the level of the liquid in each chamber at a desired height and directing the overflow of said liquid to the central portion of the next lower chamber. An additional partition 60 is provided between the cover 4 and the first reaction chamber for the purpose of directing the incoming liquid to the center of the upper reaction chamber. Each lower electrode carrying member is shown as comprising a hub portion 52a secured to shaft 12 and positioned to receive the liquid from the next higher stage and throw the same outwardly by centrifugal force, an outer ring 52c to which the electrode is secured, and a plurality of outwardly and downwardly extending arms 52b connecting said ring to said hub portion, said arms providing spaces therebetween for circulation of liquid. The partitions 47 are secured between the opposing flanges of the cover 4, the base portion 48 and the reaction rings 46 as by means of bolts 61 to provide a fluid tight fit between said cover, rings and base. An outlet for the gaseous products of reaction is provided in the upper chamber as at 62. The electrical connection of the electrodes to the source of current may be substantially the same as shown in Fig. 3.

In the operation of the apparatus illustrated in Figs. 5 and 5a, rotation of the rotatable assembly is produced by energization of motor 16, an organic liquid is introduced at 51 which overflows from partition 60 into the upper reaction chamber where, due to centrifugal force on the liquid, induced by the rotation of the lower electrode element 52, a level such as is indicated by the dotted lines "L" is assumed by the liquid which, upon inflow of more liquid through 51 is discharged from said upper chamber by overflow through the regulating sleeve 47' of partition 47, into the next lower chamber. When all the chambers are filled, the overflow from the bottom reaction chamber flows through discharge pipe 50 whereupon the electrodes may be energized and treatment of the liquid conducted. The liquid is subjected to reaction in each reaction chamber, as it passes progressively from the upper to the lower chamber. The gaseous dissociation or reaction products formed in the several chambers rise from the surface of the liquid and pass upwardly through the separating partitions 47 and sleeves 47' past the rotating members 52 to the top of the upper chamber where they are conducted away from the apparatus through outlet 62. The solid and liquid products of reaction, together with any undissociated or unreacted liquid, pass out of the apparatus through discharge outlet 50. In Fig. 5 we have illustrated only three chambers but it will be understood that any desired number of chambers of the above type may be provided in a single column without departing from our invention. We have shown three chambers for the reason that such a number is the smallest that may be efficiently operated from a three-phase current source such as we prefer to employ. The above apparatus is capable of gap adjustment during operation in the same manner as the previously described apparatus and allows efficient operation of the apparatus during the life of the electrodes.

Fig. 6 illustrates an alternative form of apparatus according to our invention comprising an upper rotatable electrode carrying member 65 disposed on the lower end of shaft 12 of a height adjustment and driving means 9 of the type illustrated in Fig. 1, said means 9 being disposed on cover 4 provided with outlet pipe 8 as above, together with a lower rotatable electrode carrying member 66 disposed on shaft 67 passing through bearing 69 and packing gland 70 and provided with pulley 71 operable by suitable driving means not shown. Bearing 69 is disposed on reaction chamber bottom plate 72, made of insulating material such as bakelite and provided with a liquid inlet 73. Reaction chamber casing 74 is secured at the top to cover 4 and at the lower end to bottom plate 72, so as to make a fluid tight fit therebetween, in any suitable manner as, for example, by means of bolts 75 and 75'. The apparatus is further supplied with support means 76 to provide clearance for the lower electrode rotation means. The upper and lower electrode carrying members, constructed in the form of spoked wheels for the purpose of passage of liquid between the hub and rim thereof are provided with electrodes 77 and 78 respectively secured thereto. These electrodes may be of the same shape and type as those shown in the two preceding forms of apparatus but are here illustrated as having arcing surfaces formed as frusto-conical surfaces of revolution whereby the liquid passing radially through the gap is provided with a longer path. Electrical contact is provided to the lower electrode as at 79, the upper electrode being grounded through the frame as at 80.

In the operation of the above described embodiment of our invention, an organic liquid is supplied to the reaction chamber at 73, and, upon the rotation of either or both of the electrodes is sucked upwardly adjacent the central part of lower electrode carrying member 66 and discharged outwardly through the gap separating the upper and lower electrodes, where it is subjected to the arc discharge therebetween and is later discharged together with solid and gaseous products of dissociation through outlet 8 in cover 4. In this form of apparatus, both electrodes are preferably rotated, either in opposite direction or at different velocities so as to cause continual shifting of the arc to different portions of both arcing faces. The degree of dissociation or reaction of the liquid may be regulated by a control of the rate of throughput of the liquid. The cover 4, together with the operating head 9 and upper electrode carrying member 65 may be removed by removal of the nuts from bolts 75 and lifting said cover and head from the casing 74, whereupon the electrodes are available for inspection or replacement. The gap between the electrode may be varied in operation as in the above described forms of apparatus.

Fig. 7 illustrates an embodiment of our invention in which a plurality of separately operable electrode assemblies are independently mounted in a single tank or reaction chamber so as to be separately insertable therein and removable therefrom, and referring thereto, a tank or reaction chamber is shown at 81 provided with a cover 82 having a plurality of flanged collars 83 each adapted to receive an electrode lead-in ring 3 together with an operating head 9 and the dependent fixed and rotatable electrode assembly units 10, whereby a plurality of such units, which may be of the type illustrated in Fig. 1, may be installed in groups as shown. Common shaft 84, driven by suitable driving means such as, for example, motor 84a, replaces the individual motors 16 shown in Fig. 1 and provides for individual operation of the movable electrodes of the separate units by means of separate belts 84' and pulleys 84". A liquid inlet pipe 110 is provided at the lower part of tank 81 and separate outlet pipes 8 are preferably provided in the cover of each unit for the discharge of products of reaction together with unreacted liquid as in the case of the apparatus shown in Fig. 1.

The operation of the above apparatus is substantially the same as that of the apparatus shown in Figs. 1, 2 and 4. All of the electrode assemblies are submerged beneath a single body of liquid maintained in tank 81 by supply of additional liquid at a suitable rate through pipe 110. The operation of any of the units, however, may be interrupted, and that unit removed, repaired or inspected without interference with any of the remaining units.

A positioning ring 81' is preferably provided for the lower end of electrode assembly 10, said ring being secured to the tank bottom 81" and adapted to fit around the lower ends of the longitudinal frame members 27 and may be provided with a flared upper portion to facilitate insertion of said assembly 10 within said ring.

Figs. 8 and 9 illustrate a form of apparatus according to our invention which has been adapted to operate horizontally, and comprises a reaction chamber or vessel 85 mounted on base 86 and provided with a liquid inlet 85', a removable cover 87 secured to said chamber in any suitable manner as, for example, by means of bolts 87' and screws 87" so as to make a fluid tight fit between said cover and said chamber, and a bearing 88 at one end and a bearing 88' and packing gland 89 at the other end of said chamber. Cover 87 is provided with packing glands 90 through which extend electrode lead-ins 91 through insulators 92, and with outlet pipe 93. A gap-regulating means is provided at the packing-gland end of the reaction chamber consisting of a support 94 secured to base 86, having a threaded portion 94' in which is disposed coactingly threaded sleeve 95 of hand wheel 96, corresponding to hand wheel 18 in Fig. 1. Shaft section 97 extends through sleeve 95 and through packing gland 89 in vessel or reaction chamber 85, said shaft section having disposed on the outer end thereof gear 98 secured thereto, and thrust bearing 99 between said gear and hand wheel 96. Said gap-regulating means is further provided with a helical spring 100 bearing at one end against support 94 and at the other end against collar 101 held in place by set collar 102 and separated therefrom by thrust bearing 103 therebetween. Spring 100 functions to maintain shaft section 97 in such a position that gear 98 is in close contact with hub of hand wheel 96 through thrust bearing 99 at all times. Operation of said hand wheel 96 will effect a movement of said shaft section 97 longitudinally toward or away from the interior of chamber 85, dependent upon the direction of operation of said hand wheel. A lock nut 96' is preferably provided for holding said hand wheel in adjusted position.

The rotatable electrode assembly is of the same type as that illustrated in Fig. 1 with the exception that the shaft section 104 is in a horizontal position and is supported at one end by bearing 88 and connected at the other end by coupling 105 to shaft section 97, so that said two shaft sections constitute in effect, a single shaft adapted for longitudinal adjustment by the means above described. The fixed electrode assembly is of the same type as that shown in Fig. 1 with the exception that the longitudinal members 106 and 106', corresponding to the vertical members 27, Fig. 1, are not secured to the vessel 85, the upper pair thereof, merely resting on lugs 107 at each end of vessel 85 which serve to prevent rotation of the fixed electrode assembly. Electrical connection is provided to the fixed electrodes through spring connectors 108 attached to said electrodes and contacting the inner ends of electrode lead-in 91. The fixed and rotatable electrode assemblies may be removed from the chamber 85 by removing the cover 87, removing the bolts from the coupling 105 and the bearing 88 and lifting the two assemblies out of the chamber. The operation of the above apparatus is in general similar to the operation of the apparatus illustrated in Fig. 1 in that the liquid is forced, by centrifugal action, between the fixed and rotating electrodes and delivered, together with gaseous and solid products of reaction, through the outlet 93.

We claim:

1. An apparatus for the treatment of organic liquids comprising two relatively rotatable electrodes spaced from one another, means for effecting continuous rapid relative rotation of said electrodes while maintaining uniform spacing therebetween, said electrodes having opposing arcing faces of extended area and of such configuration as to cause all portions of the arcing faces of both electrodes to remain equally spaced from one another throughout such extended area during such relative rotation of said electrodes so as to provide at all times a multiplicity of possible arc paths between said electrodes, the space between said electrodes being unobstructed so as to permit arcing therebetween, means for introducing organic liquid between said arcing faces, and means for maintaining an electric potential between said electrodes.

2. An apparatus as set forth in claim 1 and comprising in addition means for relative adjustment of said electrodes in a direction parallel to the axis of relative rotation thereof so as to vary the arc gap between said arcing faces.

3. An apparatus for the treatment of organic liquids comprising a reaction chamber, means for maintaining a body of organic liquid within said reaction chamber, two relatively rotatable electrodes mounted within said reaction chamber and spaced from one another, means for effecting continuous rapid relative rotation of said electrodes, said electrodes having opposing arcing faces of extended area so positioned as to be submerged within said body of liquid and of such configuration as to remain equally spaced from one another throughout such area during relative rotation of said electrodes so as to provide at all times a multiplicity of possible arc paths between said arcing faces, the space between said electrodes being unobstructed so as to permit arcing therebetween, and means for maintaining an electric potential between said electrodes.

4. An apparatus for the treatment of organic liquids comprising two electrodes having opposing arcing faces formed as similar complete surfaces of revolution about a common axis so as to permit arc formation between any opposing portions of said arcing faces regardless of the relative rotative positions of said electrodes, the space between said electrodes being unobstructed so as to permit arcing therebetween, means for effecting relative rotation of said electrodes about said common axis while maintaining uniform spacing between said opposing arcing faces, means for supplying organic liquid between said arcing faces, and means for maintaining electric potential between said electrodes.

5. An apparatus for the treatment of organic liquids comprising two ring-shaped electrodes having spaced opposing arcing faces formed as similar surfaces of revolution about a common axis, means for continuously rotating at least one of said electrodes while reserving the spacing of said arcing faces constant throughout such rotation, the space between said arcing faces being unobstructed so as to permit arcing therebetween, means for maintaining an electric potential between said electrodes, and means for supplying organic liquid to the space within said electrodes, the rotation of said at least one electrode serving to impart rotative motion to the liquid between said arcing faces and the resulting centrifugal force serving to effect positive flow of liquid from said space outwardly between said arcing faces.

6. An apparatus for the treatment of organic liquids comprising a plurality of pairs of opposing electrodes, the electrodes of each pair being relatively rotatable with respect to one another about an axis common to all of said pairs and the electrodes of each pair being provided with equally spaced arcing faces of extended area formed as surfaces of revolution about said common axis, means for effecting relative rotation of said electrodes while preserving the spacing of said arcing faces constant during such rotation, the space between the arcing faces of each of said pairs of electrodes being unobstructed so as to permit arcing therebetween, means for supplying organic liquid between the arcing faces of all of said pairs of electrodes, and means for maintaining an electric potential between the respective electrodes of each pair.

7. An apparatus as set forth in claim 6 and comprising in addition means for effecting simultaneous adjustment of one of the electrodes of all of said pairs in a direction parallel to said common axis so as to move the arcing faces thereof toward or away from the arcing faces of the other electrodes of said pairs and thus vary the arc gap therebetween.

8. An apparatus for the treatment of organic liquids comprising a reaction chamber, means for maintaining a body of organic liquid within said reaction chamber, a plurality of pairs of electrodes mounted within said reaction chamber, each of said pairs comprising two relatively rotatable electrodes spaced from one another, means for effecting continuous relative rotation of said electrodes while maintaining uniform spacing therebetween, said electrodes having extended arcing faces opposing one another so that all points on the arcing face of each electrode are at all times in position to permit arcing to the arcing face of the other electrode of said pair, the space between said electrodes being unobstructed so as to permit arcing therebetween and the arcing faces of all of said electrodes being so positioned as to be submerged within said body of liquid and to provide access of such liquid between said arcing faces.

9. An apparatus for the treatment of organic liquids comprising a vertically disposed casing means defining a reaction chamber and provided with a removable cover, a shaft extending vertically within said casing means and rotatably mounted in bearing means supported on said removable cover, a plurality of pairs of opposing ring-shaped electrodes provided with equally spaced arcing faces formed as surfaces of revolution about the axis of said shaft, one of the electrodes of each pair being mounted upon said shaft and rotatable therewith, and the other electrode of each pair being mounted in relatively fixed position within said casing means and secured to said removable cover, said shaft also extending through said cover and being provided with driving means exterior of said casing means and with means exterior of said casing means for effecting vertical movement of said shaft so as to permit simultaneous adjustment of the arcing faces of all of said rotatable electrodes toward or away from the arcing faces of the other electrodes of said pairs, said casing means being provided with liquid inlet means at the lower portion thereof and said cover portion of said casing means being provided with liquid and gas outlet means, and a plurality of lead-in conductors extending into the interior of said casing means and insulated therefrom and providing electrical connection to said relatively fixed electrodes.

10. An apparatus for the treatment of organic liquids comprising horizontally disposed casing means defining a reaction chamber and provided with a removable cover, liquid inlet means at the lower portion of said casing means and liquid and gas outlet means at the upper opposite end portion thereof, a shaft extending horizontally within said casing means and rotatably mounted in bearing means supported on said casing means, a plurality of pairs of opposing ring-shaped electrodes provided with equally spaced arcing faces formed as surfaces of revolution about the axis of said shaft, one of the electrodes of each pair being mounted on said shaft and rotatable therewith, and the other electrode of each pair being removably mounted in relatively fixed position within said casing means and provided with spring contact members, said shaft also extending outside of said casing means at one end and being provided with driving means exterior of said casing means and with means exterior of said casing means for effecting longitudinal movement of said shaft so as to permit simultaneous adjustment of the arcing faces of all of said rotatable electrodes toward or away from the arcing faces of the other electrodes of said pairs, and a plurality of lead-in conductors extending through said cover and insulated therefrom and detachably engaging said spring contact members to provide electrical connection to said relatively fixed electrodes.

11. An apparatus for the treatment of organic liquids comprising casing means, partition means defining a plurality of superposed separate liquid-receiving chambers within said casing and each provided with an upwardly projecting sleeve for maintaining a separate body of liquid in each of said chambers and defining a passage permitting overflow of liquid from each of said chambers to the next lower chamber and free escape of gas from each of said chambers to the top of said casing means, a rotatably mounted shaft extending vertically within said casing means, a plurality of relatively fixed electrode members mounted in the respective chambers, a plurality of relatively rotatable electrode members mounted on said shaft and also disposed within the respective chamber, the relatively fixed and rotatable electrode members in each chamber having mutually opposing arcing faces formed as surfaces of revolution about the axis of said shaft, means for introducing organic liquid to the uppermost of said chambers, means for removing liquid from the lowermost of said chambers, means permitting outflow of gas from the upper portion of said casing means, and means for maintaining an electric potential between the relatively fixed and relatively rotatable electrode members.

12. An apparatus for treating organic liquids comprising casing means defining a reaction chamber and a plurality of electrode assemblies independently and removably mounted in said casing means; each of said electrode assemblies comprising supporting means removably mounted on said casing means, a shaft rotatably supported on said supporting means and extending vertically downward within said casing means, a plurality of pairs of opposing electrodes provided with spaced arcing faces formed as surfaces of revolution about the axis of said shaft, one of the electrodes of each pair being mounted upon said shaft and rotatable therewith, and the other electrode of each pair being supported in relatively fixed position from said supporting means, said shaft extending outside the casing means and being provided with driving means exterior of said casing; and means for maintaining an electric potential between the respective electrodes of each pair in all of said electrode assemblies.

JOHN J. JAKOSKY.
HERBERT J. WIEDEN, Jr.